US011133669B2

(12) United States Patent
Lu et al.

(10) Patent No.: US 11,133,669 B2
(45) Date of Patent: *Sep. 28, 2021

(54) ADJUSTABLE POWER LIMITER WITH INTEGRATED POWER DETECTOR

(71) Applicant: pSemi Corporation, San Diego, CA (US)

(72) Inventors: Jianhua Lu, San Diego, CA (US); Hojung Ju, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/580,886

(22) Filed: Sep. 24, 2019

(65) Prior Publication Data

US 2020/0091712 A1 Mar. 19, 2020

Related U.S. Application Data

(63) Continuation of application No. 15/285,431, filed on Oct. 4, 2016, now Pat. No. 10,447,032.

(51) Int. Cl.
*H02H 9/04* (2006.01)
*H02H 1/00* (2006.01)
*H02H 9/00* (2006.01)

(52) U.S. Cl.
CPC .......... *H02H 9/042* (2013.01); *H02H 1/0007* (2013.01); *H02H 9/005* (2013.01); *H02H 9/008* (2013.01)

(58) Field of Classification Search
CPC ........ H01H 47/00; H01H 47/02; H01H 51/00; H01H 51/285; H01H 71/00;

(Continued)

(56) References Cited

U.S. PATENT DOCUMENTS 4,970,478 A 11/1990 Townley
7,890,891 B2 2/2011 Stuber et al.
(Continued)

OTHER PUBLICATIONS

Mattison, David D., Office Action received from the USPTO dated Jan. 22, 2019 for U.S. Appl. No. 15/285,431, 48 pgs.

(Continued)

*Primary Examiner* — Lincoln D Donovan
*Assistant Examiner* — Dave Mattison
(74) *Attorney, Agent, or Firm* — Jaquez Land Greenhaus & McFarland LLP; John Land, Esq.

(57) ABSTRACT

A limiter having a more ideal limiting function, a short response time, and an adjustable limiting threshold. In one embodiment, a self-activating limiter stack is coupled between circuit ground and a signal line between a source and a receiver. The limiter stack limits the power from the source when the voltage on the signal line exceeds the breakdown voltage of the limiter stack. The threshold of the limiter stack is controlled in part by a first control voltage applied to a control input. A rectifying power detector circuit connected between a node on the signal line and the control input of the limiter stack provides a second control voltage as a function of the signal power at the node. The combined first and second control voltages are applied to the control input to modulate the ON resistance of the limiter stack, thereby limiting the leakage power reaching the protected receiver.

23 Claims, 7 Drawing Sheets

(58) Field of Classification Search
CPC ..... H01H 71/2445; H01L 21/00; H01L 21/82; H02H 1/00; H02H 1/0007; H02H 9/00; H02H 9/005; H02H 9/008; H02H 9/042; H03K 17/00; H03K 17/0826
USPC .......................................................... 361/88
See application file for complete search history.

(56) References Cited

U.S. PATENT DOCUMENTS

| | | | |
|---|---|---|---|
| 7,910,993 | B2 | 3/2011 | Brindle et al. |
| 8,129,787 | B2 | 3/2012 | Brindle et al. |
| 8,405,147 | B2 | 3/2013 | Brindle et al. |
| 8,742,502 | B2 | 6/2014 | Brindle et al. |
| 8,928,388 | B2 | 1/2015 | Lu et al. |
| 9,024,700 | B2 | 5/2015 | Ranta |
| 9,537,472 | B2 | 1/2017 | Lu et al. |
| 9,935,678 | B1 | 4/2018 | Lu et al. |
| 10,447,032 | B2 | 10/2019 | Lu et al. |
| 2015/0137246 | A1* | 5/2015 | Shapiro .................. H01L 29/78 257/350 |
| 2015/0162901 | A1* | 6/2015 | Lu ......................... H03G 7/004 327/328 |
| 2016/0126726 | A1* | 5/2016 | Chi ......................... H02J 3/36 361/56 |
| 2018/0026440 | A1* | 1/2018 | Zhao ...................... H02H 9/041 361/56 |
| 2018/0097356 | A1 | 4/2018 | Lu et al. |
| 2018/0097539 | A1 | 4/2018 | Lu et al. |

OTHER PUBLICATIONS

Mattison, David D., Notice of Allowance received from the USPTO dated Jun. 7, 2019 for U.S. Appl. No. 15/285,431, 9 pgs.

Lu, et al., Response filed in the USPTO dated Oct. 10, 2017 for U.S. Appl. No. 15/285,448, 13 pgs.

Nguyen, Lee, Advisory Action received from the USPTO dated Oct. 19, 2017 for U.S. Appl. No. 15/285,448, 4 pgs.

Lu, et al., Response filed in the USPTO dated Jul. 14, 2017 for U.S. Appl. No. 15/285,448, 15 pgs.

Nguyen, Lee, Final Office Action received from the USPTO dated Sep. 18, 2017 for U.S. Appl. No. 15/285,448, 10 pgs.

Nguyen, Lee, Office Action received from the USPTO dated Apr. 14, 2017 for U.S. Appl. No. 15/285,448, 15 pgs.

Nguyen, Lee, Notice of Allowance received from the USPTO dated Jan. 24, 2018 for U.S. Appl. No. 15/285,448, 5 pgs.

PSemi Corporation, Response filed in the USPTO dated Mar. 4, 2019 for U.S. Appl. No. 15/285,431, 11 pgs.

* cited by examiner

Input Power Ps

FIG. 6A

Output Power Po for self-activating, adj. threshold limiter without power detector

FIG. 6B

Output Power Po for self-activating, adj. threshold limiter with power detector

ADJUSTABLE POWER LIMITER WITH INTEGRATED POWER DETECTOR

CROSS-REFERENCE TO RELATED APPLICATIONS

This application is a continuation of co-pending and commonly assigned U.S. application Ser. No. 15/285,431, filed Oct. 4, 2016 and entitled "Adjustable Power Limiter with Integrated Power Detector", which is incorporated herein by reference in its entirety.

The present application may be related to the following patent application, assigned to the assignee of the present invention, the entire disclosure of which is incorporated herein by reference as if set forth in full: U.S. patent application Ser. No. 15/285,448, filed Oct. 4, 2016, entitled "Broadband Power Limiter", now U.S. Pat. No. 9,935,678 issued Apr. 3, 2018.

BACKGROUND

(1) Technical Field

This invention relates to electronic circuitry, and more particularly to a self-activating adjustable threshold power limiter circuit.

(2) Background

Limiter circuits are used in electronic systems to limit power, voltage, or current to protect electrically-connected "downstream" electronic devices from being damaged by excessive power, voltage, or current from a source, which may be an "upstream" power source, signal source, antenna, device being tested, etc. For example, radio frequency (RF) systems in particular must be designed to operate in the presence of other RF systems, most notably in the presence of other transmitters or RF sources which can impress high levels of RF energy into a particular system. Since RF system designers cannot know with any certainty what level of RF power might arrive, an RF limiter function is generally provided at the input of an RF system.

Figure 1:
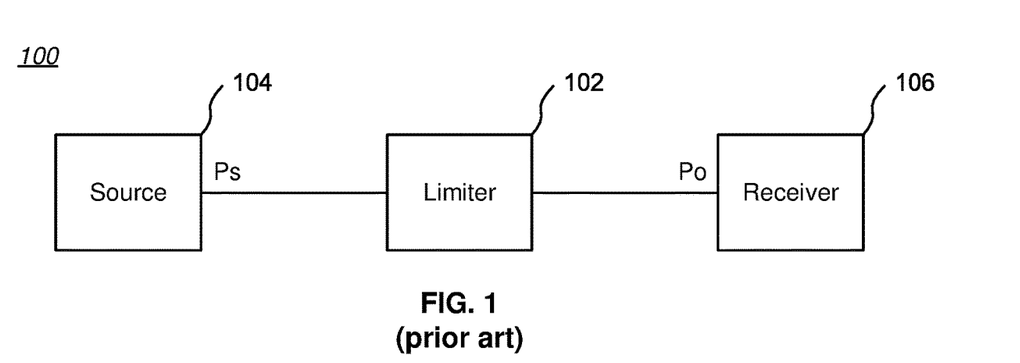
FIG. 1 is a block diagram of a prior art limiter electrically connected to limit the power Ps from a source delivered to a receiver so as not to exceed a set output power level Po.

For example, FIG. 1 is a block diagram 100 of a prior art limiter 102 electrically connected to limit the power Ps from a source 104 delivered to a receiver 106 so as not to exceed a set output power level Po. The source 104 may be, for example, an antenna receiving transmitted RF signals from one or more transmitters, such as cellular telephone transmitters. The receiver 106 may be, for example, a hand-held cellular telephone or multi-band "smart phone". Thus, factors such as absolute transmitter power, proximity to transmitters, the amount of attenuation caused by the environment (e.g., being in a metal framed building versus being outdoors) will affect the strength of the power Ps from the source 104.

Figure 2:
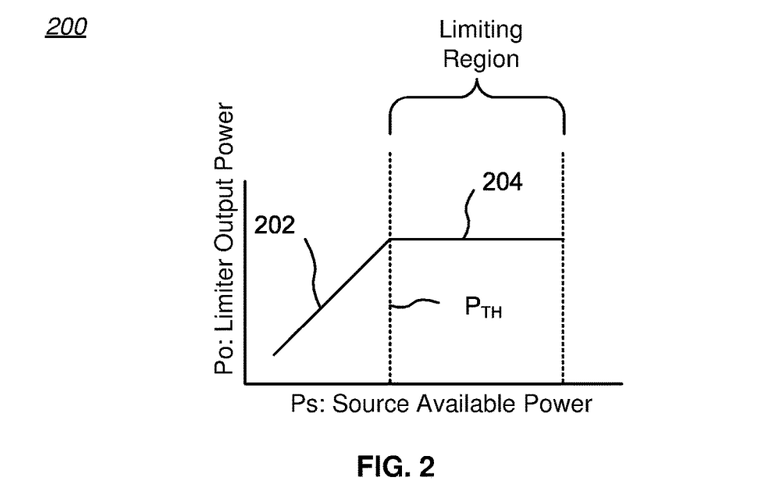
FIG. 2 is a graph showing an ideal Ps-Po characteristic curve for the limiter of FIG. 1.

FIG. 2 is a graph 200 showing an ideal Ps-Po characteristic curve for the limiter of FIG. 1. At sub-limiting signal levels, the output Po of the limiter 102 linearly tracks the input Ps from the source 104 (see linear region depicted by graph line 202). However, at a designed threshold power point $P_{TH}$, the output Po of the limiter 102 is significantly curtailed as the input Ps value increases above the threshold power point $P_{TH}$, ideally passing no additional output power Po despite increases in input power Ps, at least until device failure occurs (see flat graph line 204).

There are fundamentally two types of limiters: fixed and adjustable. Fixed limiters, such as back-to-back P-i-N diodes coupled between circuit ground and the signal line between a source 104 and a receiver 106, have excellent response time and provide a near-ideal limiting function, but their threshold level cannot be adjusted. Further, fast P-i-N diodes are not available in certain semiconductor implementation processes, such as standard bulk silicon, silicon-on-insulator (SOI), and silicon-on-sapphire (SOS) processes, and thus generally are not available for integration with other circuitry.

As their name implies, adjustable limiters permit systems to limit power at various levels. Several examples of improved adjustable limiters are described in U.S. Pat. No. 8,928,388, issued Jan. 6, 2015, entitled "Self-Activating Adjustable Power Limiter", and in allowed U.S. patent application Ser. No. 14/527,712, filed Oct. 29, 2014, entitled "Integrated Switch and Limiter Circuit", both of which are assigned to the assignee of the present invention and hereby incorporated by reference as if set forth in full (hereafter, the "Adjustable Limiter References").

Figure 3:
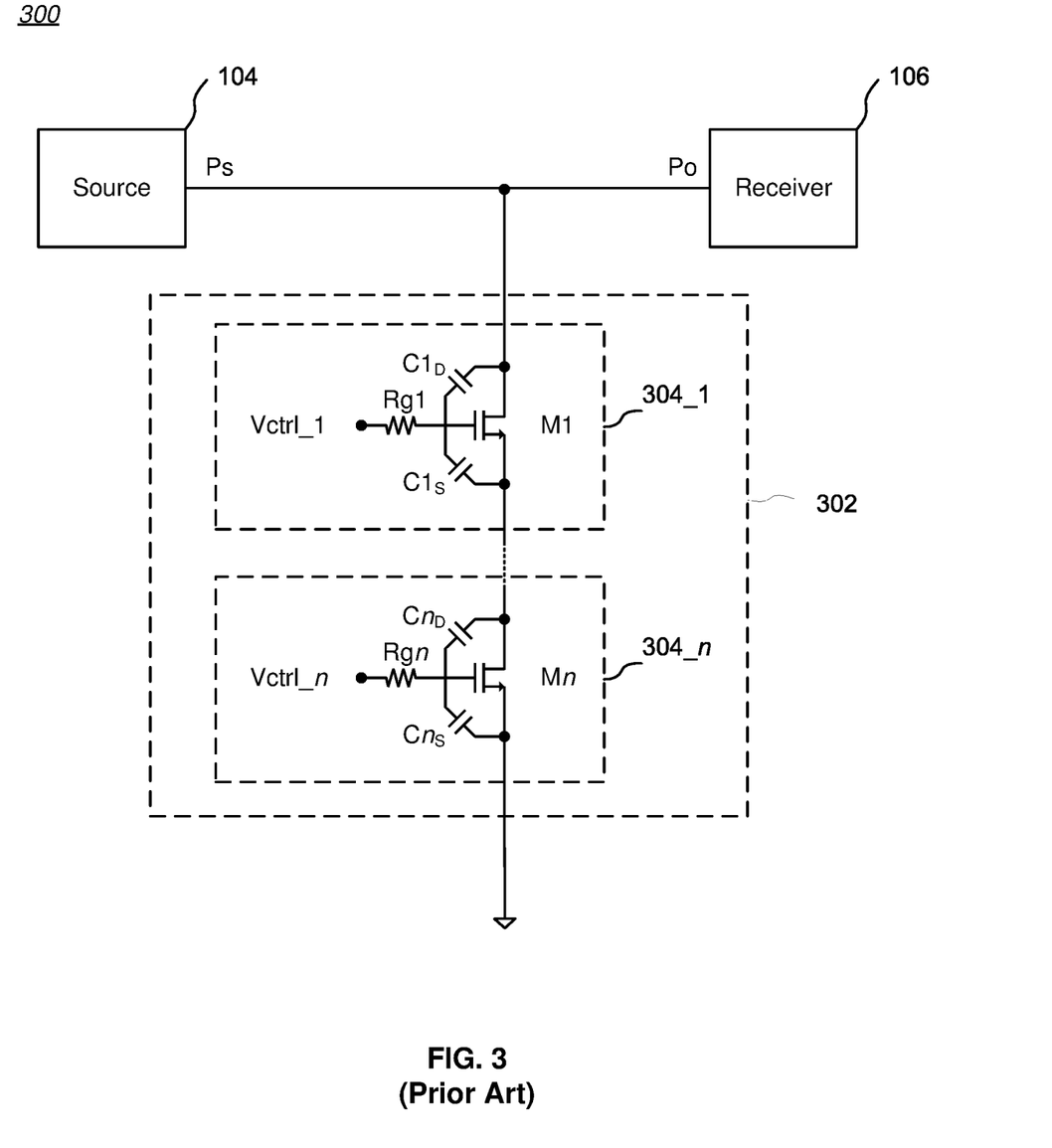
FIG. 3 is a schematic diagram of an example prior art circuit utilizing a self-activating, adjustable threshold limiter.

FIG. 3 is a schematic diagram of an example prior art circuit 300 utilizing a self-activating, adjustable threshold limiter 302 of the type taught in the Adjustable Limiter References. The limiter 302 includes a stack of one or more self-activating limiting elements 304_1 to 304_n that are series coupled between circuit ground and a signal line between a source 104 and a receiver 106. The limiting elements 304_1 to 304_n may be implemented as field effect transistors (FETs) M1-Mn, as shown in FIG. 3. The FETs M1-Mn may be, for example, NMOS or PMOS type MOSFETs.

For each FET M1-Mn, respective parasitic source-to-gate and drain-to-gate capacitors (e.g., $C1_D$, $C1_S$ to $Cn_D$, $Cn_S$) couple the drain and source of each FET to its gate, thereby dividing the RF power equally among the stack of FETs M1-Mn. Each FET M1-Mn also includes a corresponding gate resistor Rg1-Rgn, which is coupled to a corresponding control voltage Vctrl_1 to Vctrl_n; in many embodiments, the control voltages are provided from a single source and are thus equal. Further details of configuration and operation of the self-activating limiting elements 304_1 to 304_n are described in the Adjustable Limiter References.

Stacking multiple self-activating limiting elements 304_1 to 304_n provides a higher effective Vmax for the limiter 302 as a whole (i.e., a Vmax_total), where Vmax is normally the maximum voltage that may be applied to a single limiting element before it breaks down and starts its limiting function. For example, when the gate voltages for the n transistors M1-Mn of the stacked limiting elements 304_1 to 304_n are all set at the same Vctrl_x value, the limiter stack can stand off n times higher maximum voltage than a single limiting element—that is, Vmax_total=n*Vmax.

Figure 4:
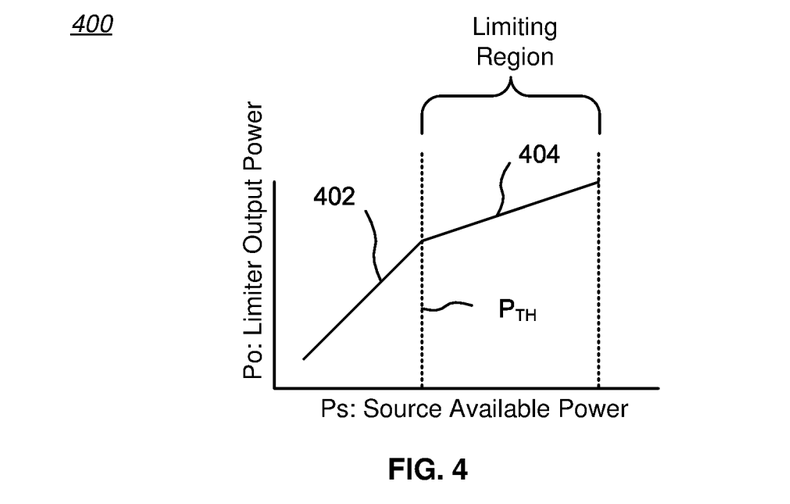
FIG. 4 is a graph showing the Ps-Po characteristic curve for a typical limiter of the type shown in FIG. 3.

In the type of adjustable threshold limiter shown in FIG. 3, the limiting function is triggered when the signal voltage output by the source 104 exceeds the breakdown voltage of the stack of limiting elements 304_1 to 304_n, the gate voltages of which have been set by Vctrl_x to adjust the triggering threshold power level. FIG. 4 is a graph 400 showing the Ps-Po characteristic curve for a typical limiter of the type shown in FIG. 3. At sub-limiting signal levels, the output Po of the limiter 302 linearly tracks the input Ps from the source 104 (see linear region depicted by graph line 402). However, at a designed threshold power point $P_{TH}$ set by Vctrl_x, the output Po of the limiter 302 is significantly curtailed as the input Ps value increases above the threshold power point $P_{TH}$, exhibiting a limiting slope (see angled graph line 404). Because the limiting function is caused by breakdown voltage of the stack of limiting elements 304_1 to 304_n, it occurs with little to no response delay.

One drawback of adjustable limiters is that they often cannot limit as completely as fixed limiters. As shown in the graph of FIG. 2, in an ideal limiter, Po is clamped at the same value for all Ps levels above the threshold power point $P_{TH}$. Referring to FIG. 4, in a practical adjustable threshold limiter, Po continues to increase as Ps increases above the threshold power point $P_{TH}$, as shown by angled graph line 404. This increasing Po level can allow power leakage to transmit past the limiter 302 and into the protected receiver 106. Thus, while the adjustable limiter of FIG. 3 is flexible due to its adjustability and maintains the rapid response time of an ideal limiter, it has the disadvantage of higher power leakage than an ideal power limiter (comparing FIG. 4 to FIG. 2).

Accordingly, there is a need for a limiter having a more ideal limiting function, a short response time, and an adjustable limiting threshold. It would also be quite useful if such a limiter could be configured to handle high power and was easy to fabricate and to integrate with other circuitry. These and other advantages are achieved by the present invention.

SUMMARY OF THE INVENTION

Embodiments of the invention encompass a limiter having a more ideal limiting function, a short response time, and an adjustable limiting threshold. Such embodiments of the limiter may be configured to handle high power and are easy to fabricate and to integrate with other circuitry.

In one embodiment, a limiter stack comprising one or more field-effect transistors (FETs) is coupled between circuit ground and a signal line between a source (or any signal input) and a receiver (or any signal output). The limiter stack serves as a self-activating, adjustable threshold power limiter. Each of the gate resistors of the constituent FETs in the limiter stack is coupled to a common control voltage, Vctrl, through a resistor R2. The threshold power point $P_{TH}$ for the limiter stack can be adjusted by biasing the gates of the FETs with Vctrl, thereby changing the effective breakdown voltage of the FETs. The limiter stack limits the power Ps from the source when the voltage on the signal line exceeds the breakdown voltage of the series-coupled FETs.

A power detector circuit is connected between a node V1 on the signal line between the source (or any signal input) and the receiver (or any signal output), and the gate resistors of the FETs. The power detector circuit provides voltage rectification and control voltage generation, where the control voltage is a function of the signal power at node V1. In one embodiment of the power detector circuit, a resistor Rin is coupled to node V1 and to a rectifier circuit, such as one or more series-connected diode elements; the diode elements are also connected to a junction between a capacitor and an optional resistor R1 (i.e., R1 may be a short in some designs). The capacitor is also connected to circuit ground, and the resistor R1 is also connected to the gate resistors of the FETs and to resistor R2. The diode elements of the power detector circuit rectify the signal voltage present at node V1, and the rectified voltage is combined through resistor R1 with the control voltage Vctrl provided through resistor R2. However, other circuits may be used to perform the rectification function.

The combined voltage is applied to the gate resistors of the FETs and modulates the ON resistance, $R_{ON}$, of the FETs, reducing $R_{ON}$ when the voltage at V1 exceeds the combined turn-on voltage of all of the diode elements. Accordingly, the limiting slope of a graph of the Ps-Po characteristic curve in the limiting region is a function not only of the control voltage Vctrl, but also of the transient signal voltage at node V1 and the values of resistors Rin, R1, and R2. Reducing the limiting slope by reducing $R_{ON}$ decreases the leakage power reaching the protected receiver.

A notable advantage of the inventive limiter is that the threshold power point $P_{TH}$ of the limiter is adjustable by setting various values for the control voltage Vctrl, and a more ideal limiting function can be achieved by further controlling the threshold power point $P_{TH}$ of the limiter by means of a fast-response integrated power detector. In addition, a limiter in accordance with the present invention can be "tuned" by an appropriate choice of design and component parameters during design and fabrication. Further, two or more of the limiter elements may be stacked to achieve voltage division by using a technology in which individual FETs can be sufficiently isolated from each other to enable such stacking. Moreover, the linearity of a FET implementation of the limiter of the present invention can be improved by providing a means for sweeping out accumulated charge trapped below the gate oxide of the FETs.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION OF THE INVENTION

Embodiments of the invention encompass a limiter having a more ideal limiting function, a short response time, and an adjustable limiting threshold. Such embodiments of the limiter may be configured to handle high power and are easy to fabricate and to integrate with other circuitry.

Figure 5:
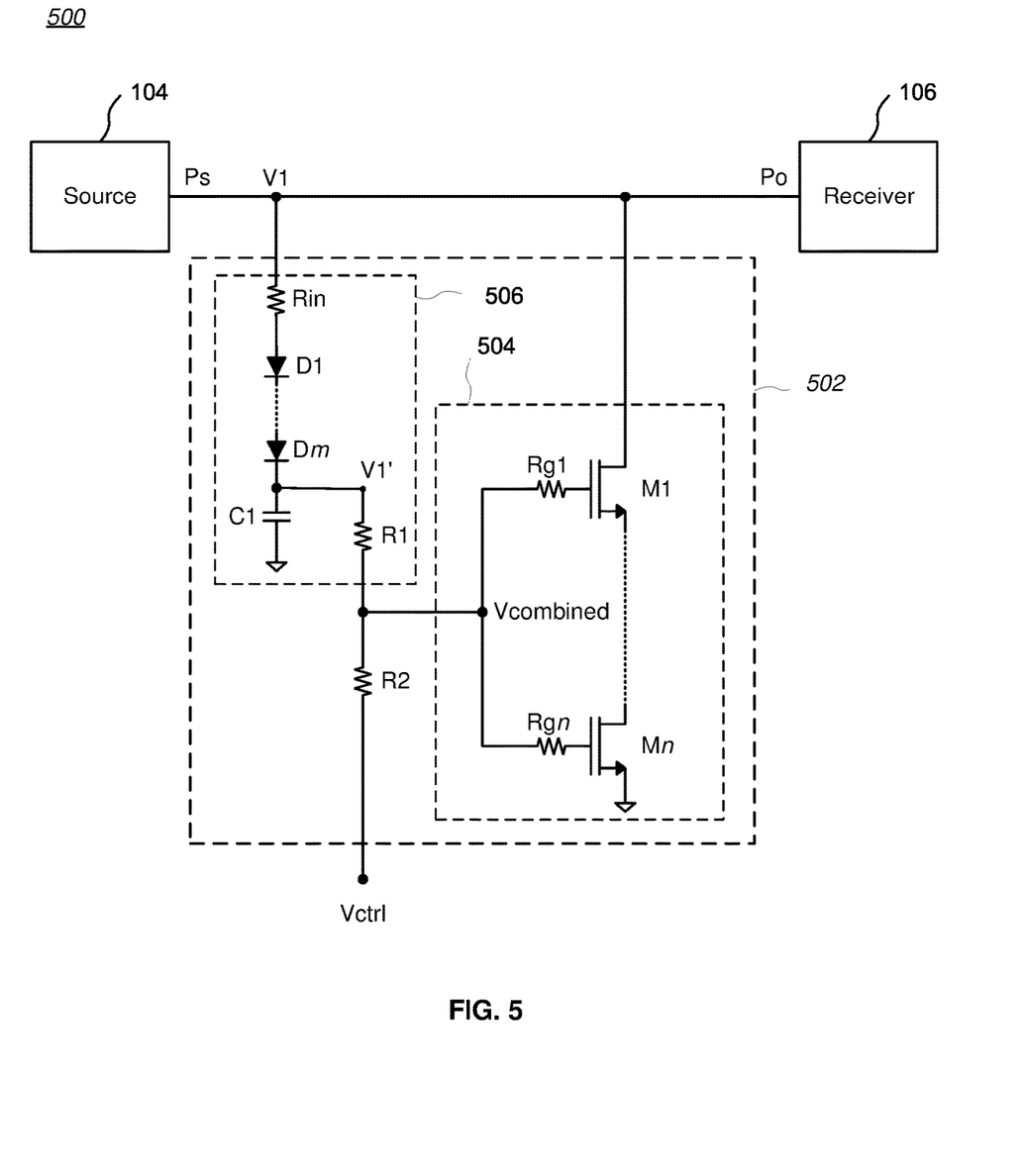
FIG. 5 is a schematic diagram of an integrated circuit (IC) embodying a self-activating, adjustable threshold limiter having an integrated power detector, in accordance with the present invention.

FIG. 5 is a schematic diagram 500 of an integrated circuit (IC) 502 embodying a self-activating, adjustable threshold limiter having an integrated power detector, in accordance with the present invention. In FIG. 5, a limiter stack 504 comprising one or more field-effect transistors (FETs) M1-Mn is coupled between circuit ground and a signal line between a source 104 and a receiver 106. The limiter stack 504 serves as a self-activating, adjustable threshold power limiter of the type shown in FIG. 3 and taught in the Adjustable Limiter References (for clarity, the capacitors associated with each FET M1-Mn as shown in FIG. 3 are omitted).

For illustration purposes only in the following discussion, the FETs M1-Mn will be treated as NMOS type FETs. As is known in the art, the various control and bias voltages discussed below may have to be reversed in polarity when using PMOS type FETs for the FETs M1-Mn.

In the illustrated embodiment, each of the gate resistors Rg1-Rgn of the constituent FETs M1-Mn in the limiter stack is coupled to a common control voltage, Vctrl. In this example, Vctrl is coupled to the gate resistors Rg1-Rgn through a common resistor R2. The threshold power point $P_{TH}$ for the limiter stack 504 can be adjusted by biasing the gates of the FETs M1-Mn with Vctrl, thereby changing the voltage at which the FETs M1-Mn start conducting, which sets the limiting threshold power point $P_{TH}$. In most embodiments of the IC 502, the control voltage Vctrl will be provided from an off-chip source.

As described above with respect to FIG. 3, the limiter stack 504 limits the power Ps from the source 104 when the voltage on the signal line between the source 104 and the receiver 106 exceeds the breakdown voltage of the series-coupled FETs M1-Mn. By itself, this behavior of the limiter stack 504 would initiate the limiting function shown in FIG. 4.

Also shown in FIG. 5 is one embodiment of a power detector circuit 506, shown connected between a node V1 on the signal line between the source 104 and the receiver 106, and the gate resistors Rg1-Rgn of the FETs M1-Mn. The power detector circuit 506 provides voltage rectification and control voltage generation, where the control voltage is a function of the signal power at node V1.

In the illustrated embodiment of one power detector circuit 506, a resistor Rin is coupled to node V1 and to a rectifier circuit, shown as a stack of one or more series-connected diode elements D1-Dm. The diode elements D1-Dm may be implemented, for example, as traditional diodes or as diode-connected FETs. The diode elements D1-Dm are also connected to a junction between a DC blocking capacitor C1 and a resistor R1, as shown. The capacitor C1 is also connected to circuit ground, and resistor R1 is also connected to the gate resistors Rg1-Rgn of the FETs M1-Mn as well as to resistor R2.

The diode elements D1-Dm of the power detector circuit 506 rectify the signal voltage present at node V1 and also serve to block voltage from Vctrl from being applied to the signal line. The output of the "bottom" diode Dm coupled to capacitor C1 is integrated (i.e., smoothed) by capacitor C1 (also known as an integrating capacitor), thereby creating a DC voltage at V1' from the rectified signal that is representative of the peak signal voltage at node V1. The DC voltage at V1' is combined through resistors R1 and R2 with the control voltage Vctrl provided through resistor R2. The combined voltage, Vcombined, approximately equals Vctrl+ (([peak of V1]−m*$V_{TH}$)*R2/(R1+R2+Rin), where m is the number of diode elements D1-Dm, and $V_{TH}$ is the turn-on voltage of an individual diode element. Vcombined is then coupled to the gate resistors Rg1-Rgn of the FETs M1-Mn, and sets the threshold power limiting level $P_{TH}$ for FETs M1-Mn. A person of ordinary skill in the art will recognize that the power detector circuit 506 comprising Rin, D1-Dm, and C1 is a rectifier circuit that converts AC (RF) signals into DC voltages, and that other circuits may be used to perform the same function.

The voltage Vcombined is applied to the gate resistors Rg1-Rgn of the FETs M1-Mn and modulates the ON resistance, $R_{ON}$, of the FETs M1-Mn, reducing $R_{ON}$ when the voltage at V1 exceeds the combined turn-on voltage of all of the diode elements D1-Dm. Accordingly, the limiting slope of a graph of the Ps-Po characteristic curve in the limiting region is a function not only of the control voltage Vctrl, but also of the transient signal voltage at node V1 and the values of resistors Rin, R1, and R2. Reducing the limiting slope by reducing $R_{ON}$ decreases the leakage power reaching the protected receiver 106.

Figure 6A:
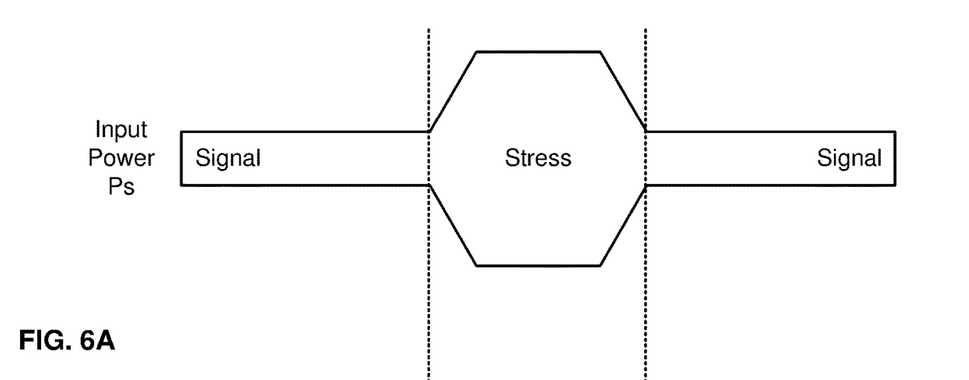
FIG. 6A is a graph of power versus time (x-axis) for the signal power Ps from a source, showing a transient stress event (axis labels omitted for clarity).

FIG. 6A is a graph of power versus time (x-axis) for the signal power Ps from a source 104, showing a transient stress event (axis labels omitted for clarity). With no limiter, the high-power stress event (e.g., a sudden spike in received signal strength beginning at time T1 and ending at time T2) would be applied to the unprotected receiver 106, potentially causing damage or interference.

Figure 6B:
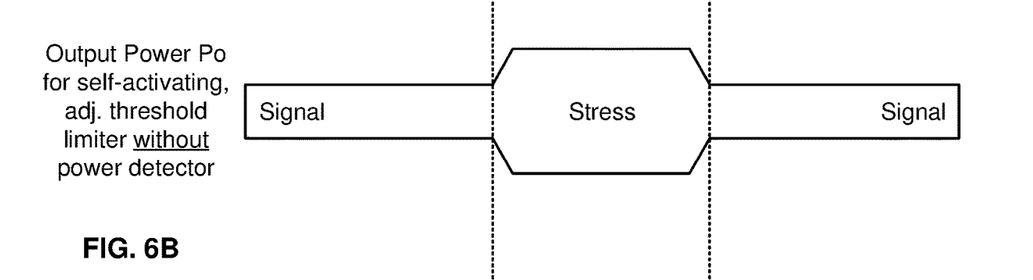
FIG. 6B is a graph of power versus time (x-axis) for the signal power Po applied to a receiver protected by a self-activating, adjustable threshold limiter without a power detector circuit, showing a transient stress event (axis labels omitted for clarity).

FIG. 6B is a graph of power versus time (x-axis) for the signal power Po applied to a receiver 106 protected by a self-activating, adjustable threshold limiter without a power detector circuit, showing a transient stress event (axis labels omitted for clarity). When Ps exceeds the threshold power point $P_{TH}$ set by the control voltage Vctrl, the limiter of FIG. 5 throttles Po below the level of FIG. 6A, due to the near-instantaneous breakdown of the stack of FETs M1-Mn. Accordingly, the output power Po applied to the receiver 106 during the stress event is mitigated, but at sufficiently high powers, the leakage power can still exceed an average tolerable power level for the receiver 106.

Figure 6C:
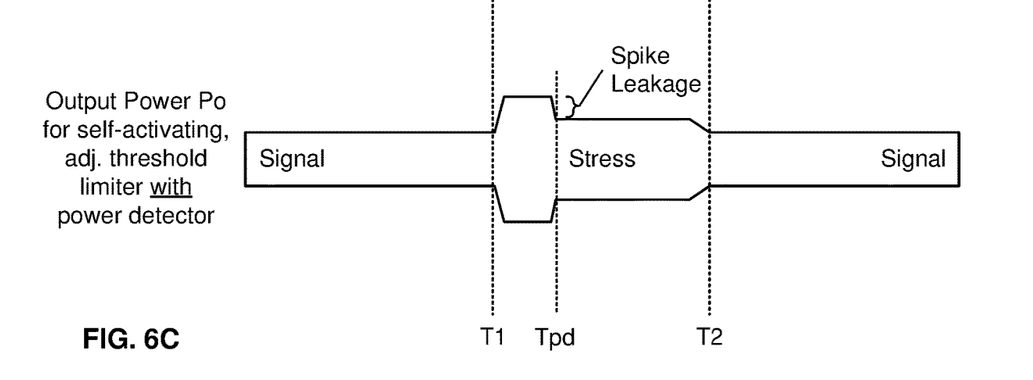
FIG. 6C is a graph of power versus time (x-axis) for the signal power Po applied to a receiver protected by a self-activating, adjustable threshold limiter with a power detector circuit, showing a transient stress event (axis labels omitted for clarity).

FIG. 6C is a graph of power versus time (x-axis) for the signal power Po applied to a receiver 106 protected by a self-activating, adjustable threshold limiter with a power detector circuit, showing a transient stress event (axis labels omitted for clarity). For a period of time after the stress event begins at T1, the limiter throttles Po to the same level as in FIG. 6B, due to the near-instantaneous breakdown of the stack of FETs M1-Mn. However, after a short delay due to the time response of the circuit components of the power detector circuit 506 (principally resistor R1 and capacitor C1, which set how fast V1' can change and the loading impedance to node V1), additional bias voltage derived from node V1 is applied to the gates of the FETs M1-Mn beginning at time Tpd. The additional bias voltage further reduces $R_{ON}$, lowering the impedance through the FETs M1-Mn from the Ps-Po signal path to circuit ground, and thus further decreasing the leakage power reaching the protected receiver 106 compared to the configuration of FIG. 6B. While there may be some "spike leakage" in the configuration of FIG. 6C at the beginning of a stress event, the performance of a self-activating, adjustable threshold limiter with a power detector circuit is equal to the performance of a self-activating, adjustable threshold limiter without a power detector circuit during the time of the "spike leakage". In addition, compared to the configuration of FIG. 6B, with the configuration of FIG. 6C, the output power Po applied to the receiver 106 after time Tpd is less and the average output power Po applied to the receiver 106 during the entire stress event is less.

Some additional power limiting protection may be provided by adding circuitry (not shown) that can latch in the voltage level at V1' or at Vcombined for an adjustable length of time to provide some hysteresis to the circuit, so that a minimum duration of power limiting is applied during a stress event.

Example Modeled Embodiment

In one modeled embodiment of an IC embodying the concepts of FIG. 5, a stack of three FETs M1-M3 were arranged on a modeled IC 502, and the power detector circuit 506 included three diodes D1-D3 as the diode elements (note that the number of diodes need not be the same as the number of FETs). By way of example only, approximate values were selected for some of the components as follows: Rin=2 k ohms; R1=0 ohms (i.e., a short); R2=50 k ohms; RgX=25 k ohms, and C1=0.1 pF. Careful design of an IC 502 embodiment will also take into account parasitic inductances (e.g., from bond wires and internal circuit traces) and parasitic capacitances.

In the illustrated embodiments, the control voltage Vctrl can be provided in various ways. For example, as shown in the Adjustable Limiter References, Vctrl may be a DC voltage source coupled directly to resistor R2 in FIG. 5. In other embodiments, a switch (which may be internal to the IC 502) my selectively connect a DC voltage source to resistor R2 for a time, and then later disconnect the voltage source, thereby creating a floating bias voltage for the gates of the FETs M1-Mn.

In addition to controlling the threshold power point $P_{TH}$ of a limiter by setting different values for Vctrl, in a FET implementation of the invention in a particular technology, the slope of Po/Ps in the limiting region is determined by the width to length (W/L) geometry of the FET structure, where W is the gate width and L is the gate length: a larger W/L ratio of the FET results in a flatter Po/Ps slope. Accordingly, a limiter in accordance with the present invention can be "tuned" by an appropriate choice of FET design parameters during design and fabrication.

For clarity, the term "self-activating power limiter" includes a device or devices (such as a stack of individual devices) having an adjustable limiting threshold, each device including:
    at least one switching element, each having a control input, a signal input, and an output;
    each switching element having a first coupling element electrically connected from the signal input of such switching element to the control input of such switching element;
    each switching element having a second coupling element electrically connected from the control input of such switching element to the output of such switching element; and
    at least one control voltage source electrically coupled to the control inputs of the at least one switching element to adjustably control the limiting threshold of the limiter.

The coupling elements referenced above including capacitive coupling elements. Further, each switching element may be in a non-conductive state while the signal input is below a selected level determined by the limiting threshold, and in a controlled variable impedance state while the signal input is above a selected level determined by the limiting threshold, the signal input being limited while the switching element is in the controlled variable impedance state. Other forms of self-activating power limiters are described in the Adjustable Limiter References.

Stacking FETs

The FETs in the limiter stack 504 of FIG. 5 may be fabricated on an IC 502 using any technology in which individual FETs can be sufficiently isolated from each other to enable stacking and voltage division, such as standard silicon (Si), silicon on insulator (SOI), silicon on sapphire (SOS), HR Si, SI Si, multi-well CMOS, or GaAs technology. As noted above, such stacking provides a higher effective Vmax_total for the limiter circuitry as a whole.

Linearity Improvement

The linearity of a FET implementation of the limiter of the present invention can be improved by providing a means for sweeping out accumulated charge trapped below the gate oxide of each FET M1-Mn, such as by use of the "HaRP"™ accumulated charge sink (ACS) technology taught in the following U.S. patents, all of which are assigned to the assignee of the present invention and incorporated herein by this reference: U.S. Pat. No. 7,890,891, issued Feb. 15, 2011, entitled "Method and Apparatus Improving Gate Oxide Reliability by Controlling Accumulated Charge"; U.S. Pat. No. 7,910,993, issued on Mar. 22, 2011, entitled "Method and Apparatus for Use in Improving Linearity of MOSFETS Using an Accumulated Charge Sink"; U.S. Pat. No. 8,129,787, issued on Mar. 6, 2012, entitled "Method and Apparatus for use in Improving Linearity of MOSFETs Using an Accumulated Charge Sink"; U.S. Pat. No. 8,405,147, issued on Mar. 26, 2013, entitled "Method and Apparatus for Use in Improving Linearity of MOSFETs Using an Accumulated Charge Sink"; U.S. Pat. No. 8,742,502, issued on Jun. 3, 2014, entitled "Method and Apparatus for Use in Improving Linearity of MOSFETs Using an Accumulated Charge Sink-Harmonic Wrinkle Reduction".

Figure 7A:
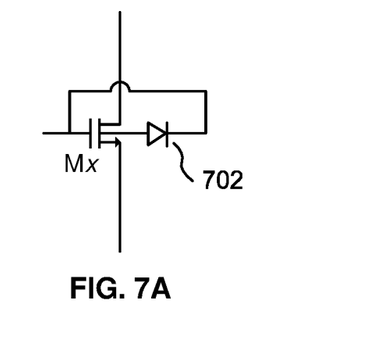
FIG. 7A is a schematic diagram of a FET Mx having the anode of a diode electrically connected to the body of the FET Mx, with the cathode electrically connected to the gate of the FET Mx.
Figure 7B:
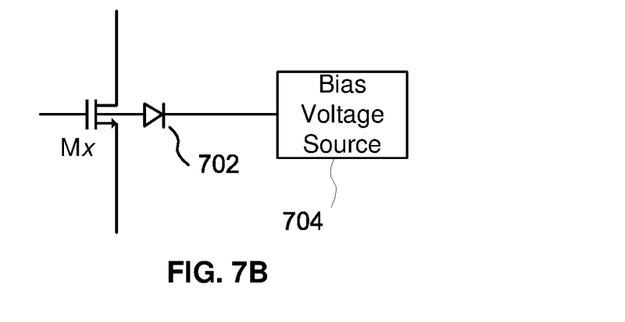
FIG. 7B is a schematic diagram of a FET Mx having the anode of a diode electrically connected to the body of the FET Mx, with the cathode electrically connected to a separate bias voltage source.

An easy way to implement such an accumulated charge sweeping means is by electrically coupling a diode to the substrate of each FET M1-Mn. For example, FIG. 7A is a schematic diagram of a FET Mx having the anode of a diode 702 electrically connected to the body of the FET Mx, with the cathode electrically connected to the gate of the FET Mx. As another example, FIG. 7B is a schematic diagram of a FET Mx having the anode of a diode 702 electrically connected to the body of the FET Mx, with the cathode electrically connected to a separate bias voltage source 704. In both FIG. 7A and FIG. 7B, the voltage applied to the diode is negative with respect to the source, the gate, and ground of the system. This voltage ensures that all accumulated charge (holes, in this case of an NMOSFET) are removed by the negative voltage supply. Removal of this accumulated charge reduces or minimizes the non-linear interactions with a signal (particularly an RF signal) that would otherwise occur. Adding an accumulated charge sink structure to a FET Mx, such as the diode 702 shown in FIG. 7A and FIG. 7B, provides superior linearity compared to prior art approaches.

Applications

Self-activating, adjustable threshold limiters with an integrated power detector in accordance with the present invention are useful in a wide variety of electronic circuits. As in the examples above, such a limiter may be electrically coupled between a signal source (e.g., a wired or wireless communication signal) and a receiver. Other examples include electrically coupling such a limiter: (1) between non-power sensitive electronic components and power sensitive electronic components, such as might occur at the front end (input) of a test instrument; (2) between an antenna and a wireless receiver, such as a radar system, a wireless base-station receiver, or a wireless broadband receiver; and (3) to the output of a power amplifier, to limit power excursions and transients at the output. Such limiters may also be used in various circuits to provide protection against electrostatic discharge (ESD).

Multiple self-activating adjustable limiters, each with an integrated power detector, can be grouped together in parallel or series to offer customized limiting characteristics. For example, two or more of such limiters may be electrically coupled in parallel; each of the limiters may have the same limiting threshold, or some or all of the limiters may have different limiting thresholds, to provide a customized limiting effect. As another example, two or more of such limiters may be electrically coupled in series; again, each of the limiters may have the same limiting threshold, or some or all of the limiters may have different limiting thresholds, to provide a customized limiting effect. In some embodiments, the limiters may be coupled to switches to allow one or more limiters to be switched into or out of circuit. In any case, the control voltages for each of the limiters may be provided by a discrete or integrated multiple output circuit, such as a positive and/or negative voltage generator.

It will be appreciated by practitioners in the art that the parallel and series configurations described above can be used alone or combined into a wide variety of configurations, such as to handle unique power situations, provide specialized limiting thresholds, or handle particular frequency regimes. For example, a set of series-connected limiters may have different threshold levels, turning on successively as signal power Ps continues to increase, in order to provide additional attenuation of the signal power.

A self-activating, adjustable threshold limiter with an integrated power detector may be coupled between a source and multiple branches of N parallel sets of elements, such as filters and receivers, such as may be used in a multi-path or multi-band wireless or wired receiver system (e.g., multi-band cellular telephone systems, base stations, phased-array radar, and test equipment).

Two or more self-activating, adjustable threshold limiters, each with an integrated power detector, may be electrically coupled between corresponding filters and receivers in two or more parallel branches, with each of the branches electrically coupled to a single source, such as may be used in a multi-path or multi-band wireless or wired receiver system (including the above examples). Such a configuration is particularly useful because the invention lends itself readily to integration with other circuitry, and makes it cost-effective to providing limiting on multiple branches or multiple ports and paths within an integrated circuit system. For example, the power in each filtered frequency band may differ significantly from band to band, and thus providing a self-activating, adjustable threshold limiter with an integrated power detector after each filter may be particularly useful in protecting each receiver that might be exposed to excessive power within its respective frequency band.

A self-activating, adjustable threshold limiter with an integrated power detector may be electrically coupled in a single ended form (i.e., with one connection to circuit ground) to a digitally tuned capacitor circuit comprising an inductor and N branches each comprising a capacitor and a switch. Alternatively, such a limiter may be electrically coupled in a differential form (i.e., with one connection to each of two rails) to a digitally tuned capacitor circuit comprising a first rail having a first inductor, a second rail having a second inductor, and N branches spanning the rails, each branch comprising a capacitor and a switch. The structure and implementation of such digitally tuned capacitor circuits is further described in U.S. Pat. No. 9,024,700, issued May 5, 2015, entitled "Method and Apparatus for Use in Digitally Tuning a Capacitor in an Integrated Circuit Device", assigned to the assignee of the present invention and incorporated herein by this reference as if set forth in full.

Methods

Another aspect of the invention includes methods for limiting power between a source and a receiver by means of a self-activating power limiter having an adjustable limiting threshold and an integrated power detector.

Figure 8:
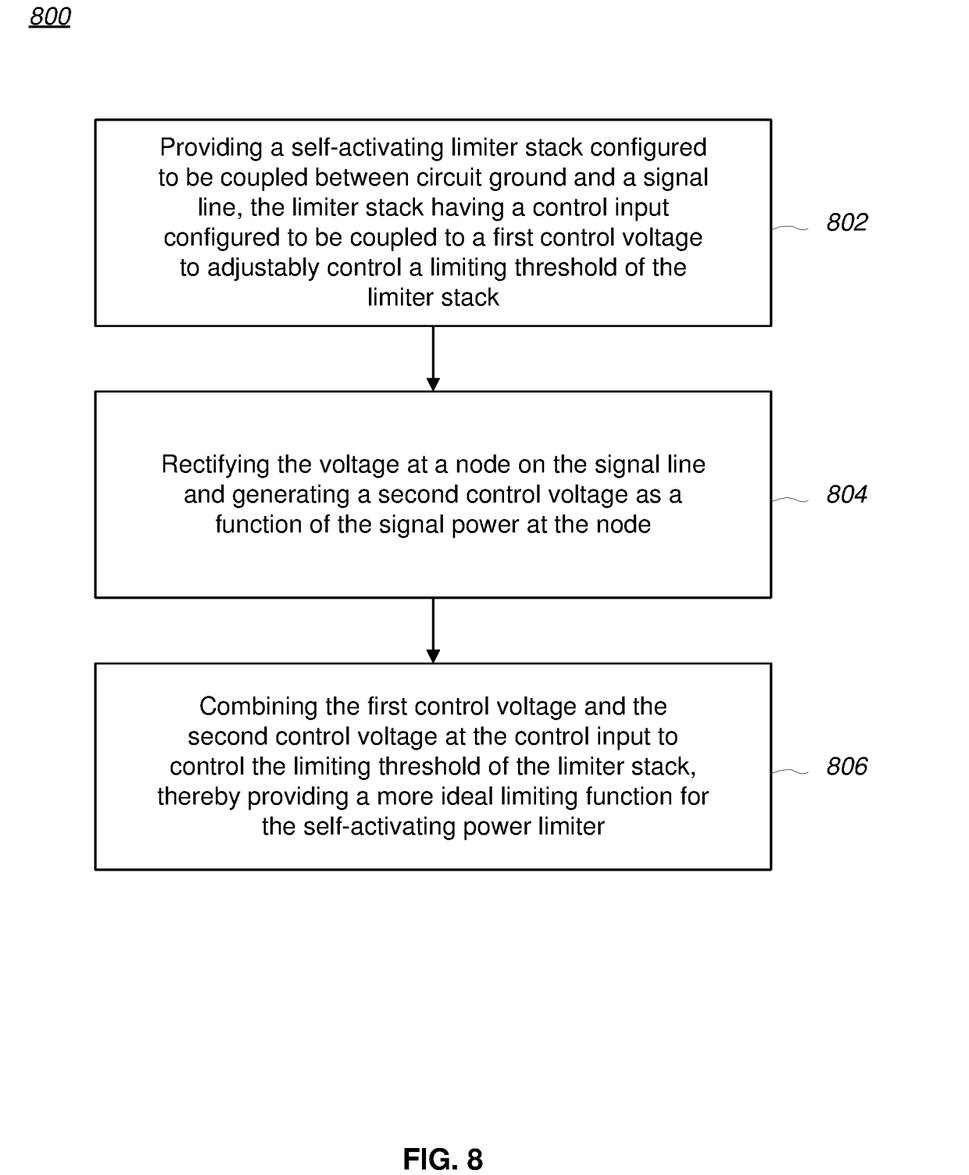
FIG. 8 is a process chart showing a first method for limiting power between a source and a receiver by means of a self-activating power limiter having an adjustable limiting threshold and an integrated power detector.

For example, FIG. 8 is a process chart 800 showing a first method for limiting power between a source and a receiver by means of a self-activating power limiter having an adjustable limiting threshold and an integrated power detector, including: providing a self-activating limiter stack configured to be coupled between circuit ground and a signal line between a source (or any signal input) and a receiver (or any signal output), the limiter stack having a control input configured to be coupled to a first control voltage to adjustably control a limiting threshold of the limiter stack (STEP 802); rectifying the voltage at a node on the signal line and generating a second control voltage as a function of the signal power at the node (STEP 804); and combining the first control voltage and the second control voltage at the control input to control the limiting threshold of the limiter stack, thereby providing a more ideal limiting function for the self-activating power limiter (STEP 806).

This method may also encompass: rectifying the voltage at the node by coupling a power detector circuit to the control input of the limiter stack, the power detector circuit being configured to be coupled between circuit ground and the node, wherein the power detector circuit includes a rectifier subcircuit comprising one or more series-connected diodes; rectifying the voltage at the node includes coupling a power detector circuit to the control input of the limiter stack, the power detector circuit being configured to be coupled between circuit ground and the node, wherein the power detector circuit includes a first resistor configured to be coupled to the node, one or more series-connected diodes coupled in series to the first resistor, a capacitor coupled in series to the one or more series-connected diodes and configured to be coupled to circuit ground, and a second resistor coupled between the junction of the one or more series-connected diodes and the capacitor and to the control input of the limiter stack; and/or configuring the self-activating power limiter to limit excessive power from a source of radio frequencies.

Figure 9:
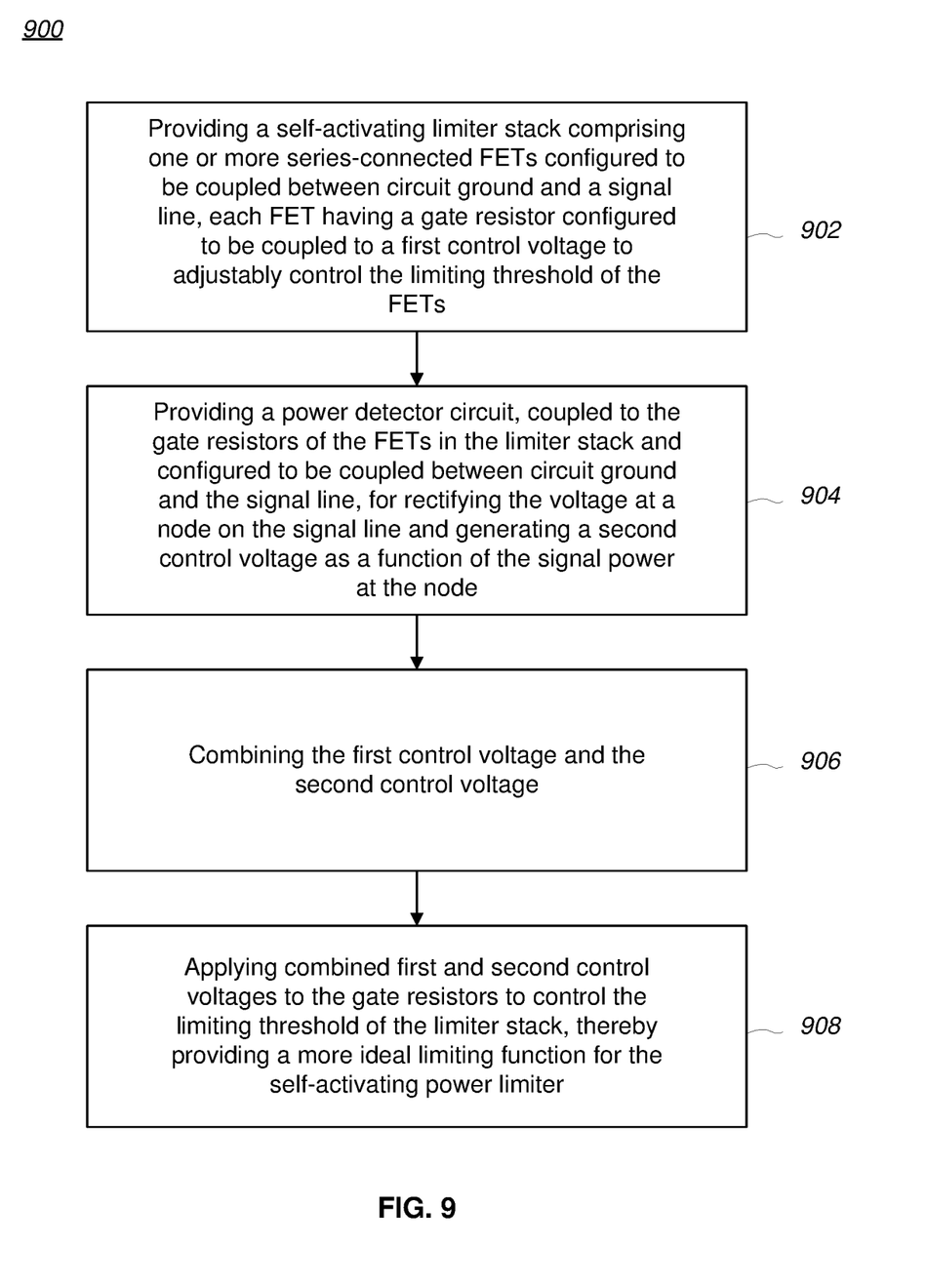
FIG. 9 is a process chart showing a second method for limiting power between a source and a receiver by means of a self-activating power limiter having an adjustable limiting threshold and an integrated power detector.

As another example, FIG. 9 is a process chart 900 showing a second method for limiting power between a source and a receiver by means of a self-activating power limiter having an adjustable limiting threshold and an integrated power detector, including: providing a self-activating limiter stack comprising one or more series-connected field-effect transistors (FETs) configured to be coupled between circuit ground and a signal line between a source (or any signal input) and a receiver (or any signal output), each FET having a corresponding gate resistor configured to be coupled to a first control voltage to adjustably control the limiting threshold of the FETs (STEP 902); providing a power detector circuit, coupled to the gate resistors of the FETs in the limiter stack and configured to be coupled between circuit ground and the signal line between the source and the receiver, for rectifying the voltage at a node on the signal line and generating a second control voltage as a function of the signal power at the node (STEP 904); combining the first control voltage and the second control voltage (STEP 906); and applying the combined first and second control voltages to the gate resistors to control the limiting threshold of the limiter stack, thereby providing a more ideal limiting function for the self-activating power limiter (STEP 908).

This method may also encompass: the power detector circuit including a rectifier subcircuit comprising one or more series-connected diodes; the power detector circuit including a first resistor configured to be coupled to the node, one or more series-connected diodes coupled in series to the first resistor, a capacitor coupled in series to the one or more series-connected diodes and configured to be coupled to circuit ground, and a second resistor coupled between the junction of the one or more series-connected diodes and the capacitor and to the gate resistors of the FETs in the limiter stack; configuring the self-activating power limiter to limit excessive power from a source of radio frequencies; each FET including an accumulated charge sink structure; and/or the accumulated charge sink structure including a diode.

Fabrication Technologies and Options

The term "MOSFET" technically refers to metal-oxide-semiconductors; another synonym for MOSFET is "MISFET", for metal-insulator-semiconductor FET. However, "MOSFET" has become a common label for most types of insulated-gate FETs ("IGFETs"). Despite that, it is well known that the term "metal" in the names MOSFET and MISFET is now often a misnomer because the previously metal gate material is now often a layer of polysilicon (polycrystalline silicon). Similarly, the "oxide" in the name MOSFET can be a misnomer, as different dielectric materials are used with the aim of obtaining strong channels with smaller applied voltages. Accordingly, the term "MOSFET" as used herein is not to be read as literally limited to metal-oxide-semiconductors, but instead includes IGFETs in general.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET and IGFET structures), or in hybrid or discrete circuit forms. Integrated circuit embodiments may be fabricated using any suitable substrates and processes, including but not limited to standard bulk silicon, silicon-on-insulator (SOI), silicon-on-sapphire (SOS), GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS enables low power consumption, the ability to withstand high power signals during operation due to FET stacking, good linearity, and high frequency operation (in excess of about 1 GHz, and particularly above about 10 GHz). Monolithic IC implementation is particularly useful since parasitic capacitances generally can be kept low (or at a minimum, kept uniform across all units, permitting them to be compensated) by careful design.

Voltage levels may be adjusted or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially stacking components (particularly FETs) to withstand greater voltages, and/or using multiple components in parallel to handle greater currents. Additional circuit components may be added to enhance the capabilities of the disclosed circuits and/or to provide additional functional without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion. It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A self-activating power limiter having an adjustable limiting threshold and an integrated power detector, the self-activating power limiter including:
   (a) a self-activating limiter stack configured to be coupled between circuit ground and a signal line between a source and a receiver, the limiter stack having a control input configured to be coupled to a first control voltage to adjustably control a limiting threshold of the limiter stack and having an ON resistance $R_{ON}$; and
   (b) a power detector circuit, coupled to the control input of the limiter stack and configured to be coupled to the signal line between the source and the receiver, for generating a second control voltage as a function of the signal power at a node on the signal line;
   wherein the first control voltage and the second control voltage are combined at the control input to set a power limiting level for the limiter stack and modulate the ON resistance $R_{ON}$ of the limiter stack to reduce leakage power reaching the receiver.

2. The invention of claim 1, wherein the second control voltage is a function of a signal voltage at the node on the signal line.

3. The invention of claim 1, wherein the power detector circuit includes a rectifier subcircuit comprising one or more series-connected diodes.

4. The invention of claim 3, wherein the second control voltage is generated when a voltage at the node on the signal line exceeds a combined turn-on voltage of all of the one or more series-connected diodes.

5. The invention of claim 1, wherein the power detector circuit includes a first resistor configured to be coupled to the node, one or more series-connected diodes coupled in series to the first resistor, a capacitor coupled in series to the one or more series-connected diodes and configured to be coupled to circuit ground, and a second resistor coupled between the junction of the one or more series-connected diodes and the capacitor and to the control input of the limiter stack.

6. The invention of claim 5, wherein the second control voltage is generated when a voltage at the node on the signal line exceeds a combined turn-on voltage of all of the one or more series-connected diodes.

7. The invention of claim 1, wherein the self-activating power limiter is configured to limit excessive power from a source of radio frequencies.

8. The invention of claim 1, wherein the self-activating power limiter includes one or more series-connected field-effect transistors (FETs) configured to be coupled between circuit ground and the signal line between the source and the receiver, each FET having a corresponding gate resistor configured as the control input, the FETs having an ON resistance $R_{ON}$.

9. The invention of claim 8, wherein each FET includes an accumulated charge sink structure.

10. The invention of claim 9, wherein the accumulated charge sink structure includes a diode.

11. The invention of claim 1, wherein the source is at least one of a wired communication signal, a wireless communication signal, an antenna, an antenna receiving transmitted RF signals from at least one cellular telephone transmitter, a non-power sensitive electronic component, and/or the output of an amplifier.

12. The invention of claim 1, wherein the receiver is at least one of a wireless receiver, a hand-held cellular telephone, a multi-band smart phone, a power sensitive electronic component, the input of a test instrument, a radar system, a wireless base-station receiver, and/or a wireless broadband receiver.

13. A self-activating power limiter having an adjustable limiting threshold and an integrated power detector, the self-activating power limiter including:
   (a) a self-activating limiter stack comprising one or more series-connected field-effect transistors (FETs) configured to be coupled between circuit ground and a signal line between a source and a receiver, each FET having a corresponding gate resistor configured to be coupled to a first control voltage to adjustably control the limiting threshold of the FETs, each FET having an ON resistance $R_{ON}$; and
   (b) a power detector circuit, coupled to the gate resistors of the FETs in the limiter stack and configured to be coupled to the signal line between the source and the receiver, for generating a second control voltage as a function of the signal power at a node on the signal line; wherein the first control voltage and the second control voltage are combined and applied to the gate resistors to set a power limiting level for the limiter stack and modulate the ON resistance $R_{ON}$ of the FETs to reduce leakage power reaching the receiver.

14. The invention of claim 13, wherein the second control voltage is a function of a signal voltage at the node on the signal line.

15. The invention of claim 13, wherein the power detector circuit includes a rectifier subcircuit comprising one or more series-connected diodes.

16. The invention of claim 15, wherein the second control voltage is generated when a voltage at the node on the signal line exceeds a combined turn-on voltage of all of the one or more series-connected diodes.

17. The invention of claim 13, wherein the power detector circuit includes a first resistor configured to be coupled to the node, one or more series-connected diodes coupled in series to the first resistor, a capacitor coupled in series to the one or more series-connected diodes and configured to be coupled to circuit ground, and a second resistor coupled between the junction of the one or more series-connected diodes and the capacitor and to the gate resistors of the FETs in the limiter stack.

18. The invention of claim 17, wherein the second control voltage is generated when a voltage at the node on the signal line exceeds a combined turn-on voltage of all of the one or more series-connected diodes.

19. The invention of claim 13, wherein the limiter is configured to limit excessive power from a source of radio frequencies.

20. The invention of claim 13, wherein each FET includes an accumulated charge sink structure.

21. The invention of claim 20, wherein the accumulated charge sink structure includes a diode.

22. The invention of claim 13, wherein the source is at least one of a wired communication signal, a wireless communication signal, an antenna, an antenna receiving transmitted RF signals from at least one cellular telephone transmitter, a non-power sensitive electronic component, and/or the output of an amplifier.

23. The invention of claim 13, wherein the receiver is at least one of a wireless receiver, a hand-held cellular telephone, a multi-band smart phone, a power sensitive electronic component, the input of a test instrument, a radar system, a wireless base-station receiver, and/or a wireless broadband receiver.

* * * * *